United States Patent [19]
Zurad

[11] 3,906,316

[45] Sept. 16, 1975

[54] ELECTRIC MOTOR STARTING CIRCUIT

[75] Inventor: Joseph T. Zurad, Chicago, Ill.

[73] Assignee: Bodine Electric Company, Chicago, Ill.

[22] Filed: Apr. 17, 1974

[21] Appl. No.: 461,284

[52] U.S. Cl. .......... 318/221 D; 318/221 E; 318/227; 318/229
[51] Int. Cl.² .......................................... H02P 1/44
[58] Field of Search ............ 318/220, 221 R, 221 D, 318/221 E, 227, 229

[56] References Cited
UNITED STATES PATENTS

| | | | |
|---|---|---|---|
| 1,857,411 | 5/1932 | Spencer | 318/221 D |
| 1,871,392 | 8/1932 | Seeger | 318/221 D |
| 2,028,934 | 1/1936 | Kennedy | 318/221 D |
| 3,530,348 | 9/1970 | Conner | 318/221 E |

*Primary Examiner*—G. Z. Rubinson
*Attorney, Agent, or Firm*—Roy E. Petherbridge; Robert L. Lindgren; Edward D. Gilhooly

[57] ABSTRACT

An electric motor stator operating circuit is disclosed herein providing an operating circuit with two motor running windings with capacitance and choke coil inductance in one of the windings, and a solid state switching circuit for switching the inductance choke in and out of the winding circuitry.

2 Claims, 1 Drawing Figure

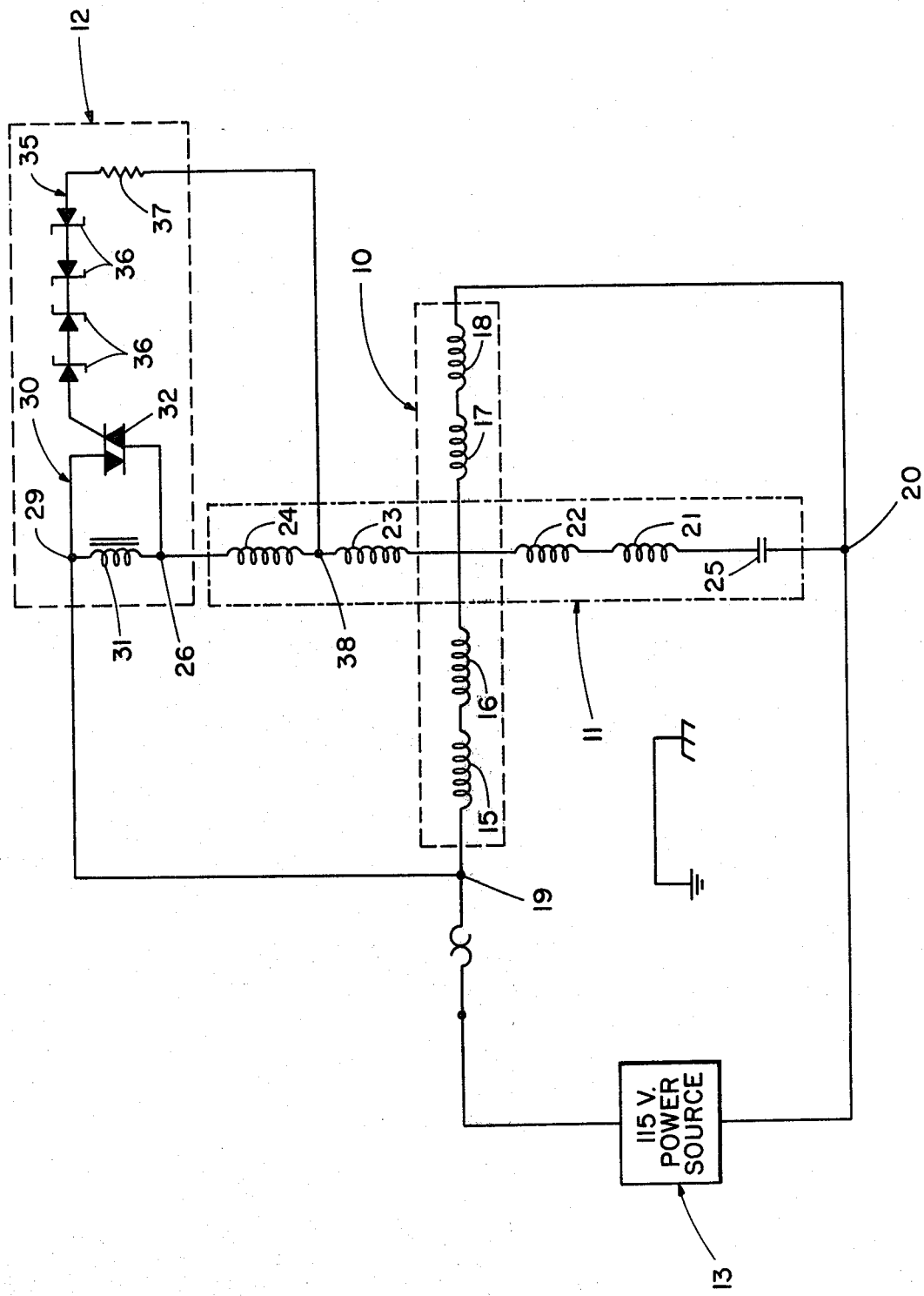

ELECTRIC MOTOR STARTING CIRCUIT

SUMMARY OF THE INVENTION

Permanent split-capacitor motors are known. Such motors have a capacitor in series with their auxiliary windings, which remains in the circuit during both starting and running, such that the capacitance causes the current in the capacitor winding to lead the main winding current at the selected design point of the motor by approximately 90°. However, the action of the capacitor on the current flowing in the capacitor winding is affected to a considerable extent, both in value and in time, by the speed of the rotor, the value of the current in the capacitor winding being lowest when the rotor is at rest, and highest when the rotor speed is at its maximum. Accordingly, a capacitor and capacitor winding circuit which is optimized for starting conditions will not generally be satisfactory for normal running operation of the motor. Similarly, such a circuit which is optimized for running operation of the motor will not be completely satisfactory for starting conditions.

Accordingly, two capacitor start, one capacitor run motors have been devised to alleviate this problem. In such motors the run capacitor and capacitor winding circuit may be chosen for optimum running conditions of the motor. Additionally, a start capacitor is connected in parallel with the run capacitor to provide increased torque in the lower starting speeds of the motor. When the motor approaches breakdown speed, the start capacitor is disconnected from the run capacitor for normal operation of the motor at running speeds.

In the past, centrifugal switches and starting relays have been utilized to disconnect such start capacitors from the run capacitor of the motor. However, both devices are not completely satisfactory from a reliability standpoint, although such relays have proven less susceptible to failure than centrifugal switches. Solid state or other switching circuits have also been used to disconnect the start capacitor, but these circuits have proven relatively complex and expensive.

Accordingly, the general object of this invention is to provide a reliable, efficient, precise and otherwise improved electric motor stator operating circuit, and particularly, wherein automatically operable circuitry provides added torque in an efficient manner at low motor speeds below breakdown, and wherein the current drawing circuitry for providing the added torque will be automatically eliminated above breakdown speeds of the motor to provide the efficient higher speed operation.

Other advantages and novel aspects of the invention will become apparent upon review of the following detailed description, in conjunction with the accompanying drawing wherein:

The FIGURE is an illustrative representation of the electric motor operating circuit of this invention.

Referring to the drawing there is illustrated a main or first motor winding 10, run capacitor and supplemental or second capacitor motor winding 11, starting circuit 12, and an alternative current source 13. Main winding 10 has four internal inductance windings 15, 16, 17 and 18 for operating a motor and is connected to source 13 at 19 and 20. Four windings are shown in the drawing to represent a four pole motor. Other numbers of poles may be used, such as two, six, eight, etc. Second or supplemental capacitor motor winding 11 has a like number of internal inductance windings, such as 21, 22, 23, and 24, for similarly operating the same motor but has a capacitor 25 in series therein whereby second winding operates at a shifted or split phase, and is connected to source 13 at 20, and to starting circuit 12 at 26. The capacitor 25 would normally be located external to the motor.

Starting circuit 12 includes a shunting circuit 30 connected in parallel with a load choke coil 31 at 26 and 29. A switch element 32 is inserted in parallel with choke 31 in shunt circuit 30, to allow shunt circuit 30 to be connected to shunt choke coil 31 when switch element 32 is conductive, or to disconnect shunt circuit 30 when switch element 32 is nonconductive to allow choke coil 31 to be effective. The particular switch element 32 illustrated is a solid state triac switch the gate contact of which is connected to a switch gating circuit 35. Full phased or bi-directional Zener diodes 36 are connected in series with a resistance 37 in gating circuit 35 to limit the triac gate current, with the gating circuit 35 connected in parallel with switch 32 and a portion, such as 24, of supplemental capacitor winding 11 between the gating side of switch 32 and 38. Although four Zener diodes 36 are shown in the drawing, it will be understood that two oppositely directed Zener diodes would be satisfactory and would operate in the same manner, the additional two diodes being utilized to obtain better heat dissipation. It will also be understood that a different shunting circuit may be used, such as a pair of oppositely directed silicon controlled rectifiers connected in parallel, which are separately gated.

In operation, the motor operating circuit of this invention is actuated by alternating current power source 13 whereby main stator windings 10 provide the primary running motivation for a rotor (not shown). Supplemental winding 11 is similarly actuated by source 13 to provide a second running motivation for a rotor. However, capacitor 25 causes a phase shift of the flux created by second winding 11 whereby permanent split phase capacitor circuitry is provided.

By adding inductance choke 31 in series with capacitor winding 11 of the permanent split capacitor circuitry 11, the reactance of the series combination of capacitor winding and running capacitor is reduced. This reduction in reactance results in increased current in capacitor winding 11 which in turn increases the stator flux density derived therefrom due to the capacitor winding 11, providing increased motor torque as long as external inductance choke 31 is effectively in the capacitor winding circuit 11.

The increased motor torque, as created by the circuit of this invention when operated as referred to above, is highly desirable at the lower speeds below the torque breakdown speed. At approximately the breakdown speed, choke 31 is removed from effect on capacitor winding 11 by switch 32. Switch 32 removes choke 31 from capacitor winding circuit 11 in response to the voltage across the series combination of a portion of the capacitor winding, such as 24 at 38 and the choke and by using this voltage to trigger switch 32 into the conducting state thereby shunting choke 31 effectively out of capacitor circuit 11.

In particular, as the speed of the motor increases to breakdown speed, the voltage across 2938 will increase until the blocking Zener diodes 36 arrive at predetermined avalanche breakdown voltage whereupon gating circuit 35 will conduct sufficient current every half cycle of the power source to gate or trigger triac 32 into the conducting state to effectively electrically eliminate or short out choke 31. Thus, at higher speed the inefficient added torque producing current will be eliminated all as per the general objects of the invention hereof.

It is to be understood that the invention is not to be limited to the specific constructions and arrangements shown and described, as it will be understood to those skilled in the art that changes may be made without departing from the principles of the invention.

What is claimed is:

1. An electric motor stator operating circuit comprising;
   an alternating current power supply;
   a first motor stator winding inductance connected to said power supply to provide a main motor running winding;
   a second motor stator winding inductance connected to said power supply to provide a supplemental motor running winding;
   a capacitor connected in series with said second winding inductance to shift the phase thereof with respect to said first winding inductance for providing a permanent-split phase capacitor motor;
   an inductance choke connected in series with said second winding inductance and said capacitor to decrease the reactance thereof for increasing the starting torque provided by said second winding inductance;
   a triac connected in parallel with said choke and being actuable to short-circuit said choke to eliminate the effect thereof in said circuit; and
   a gating circuit connected in parallel with said triac and being adapted to be conductive only above a given voltage for triggering on said triac, said gating circuit including a pair of bi-directional zener diodes connected between a gate of said triac and a portion of said supplemental winding.

2. An electric motor stator operating circuit as claimed in claim 1, further comprising a resistor connected in series with said zener diodes to limit current thereof.

* * * * *